United States Patent [19]

Hisgen et al.

[11] Patent Number: 4,722,993

[45] Date of Patent: Feb. 2, 1988

[54] WHOLLY AROMATIC MESOMORPHIC POLYESTER AMIDES AND THE PREPARATION THEREOF

[75] Inventors: Bernd Hisgen, Limburgerhof; Michael Portugall, Wachenheim; Hans-Josef Sterzel, Dannstadt-Schauernheim, all of Fed. Rep. of Germany

[73] Assignee: BASF Aktiengesellschaft, Ludwigshafen, Fed. Rep. of Germany

[21] Appl. No.: 937,677

[22] Filed: Dec. 4, 1986

[30] Foreign Application Priority Data

Dec. 4, 1985 [DE] Fed. Rep. of Germany ....... 3542856

[51] Int. Cl.$^4$ .................... C08G 63/54; C08G 69/44
[52] U.S. Cl. .................................. 528/183; 528/179; 528/193; 528/194; 528/210
[58] Field of Search .............. 528/183, 193, 194, 210, 528/179

[56] References Cited

U.S. PATENT DOCUMENTS

| | | | |
|---|---|---|---|
| 4,118,372 | 10/1978 | Schaefgen | 528/190 |
| 4,330,457 | 5/1982 | East et al. | 524/602 |
| 4,339,375 | 7/1982 | Calundann et al. | 524/602 |
| 4,351,917 | 9/1982 | Calundann et al. | 524/602 |
| 4,351,918 | 9/1982 | Charbonneau et al. | 524/602 |
| 4,355,132 | 10/1982 | East et al. | 524/602 |
| 4,375,530 | 3/1983 | Hay et al. | 524/605 |
| 4,398,019 | 8/1983 | Cox et al. | 528/183 |
| 4,473,681 | 9/1984 | East | 524/601 |
| 4,499,256 | 2/1985 | Blundell et al. | 528/172 |
| 4,522,974 | 6/1985 | Calundann et al. | 524/605 |
| 4,564,669 | 1/1986 | Dicke et al. | 528/173 |

FOREIGN PATENT DOCUMENTS

7715 7/1979 European Pat. Off. .
81900 10/1982 European Pat. Off. .

OTHER PUBLICATIONS

Makromol Chem., Board 127 (1969) (not available in English version).

*Primary Examiner*—Lucille M. Phynes
*Attorney, Agent, or Firm*—Keil & Weinkauf

[57] ABSTRACT

Wholly aromatic mesomorphic polyester amides which form a liquid-crystalline fiber-forming melt below 320° C. and are composed of
(a) from 3 to 30 mol % of repeat units of the formula

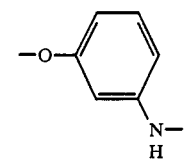

(b) from 3 to 25 mol % of one or more of the repeat units of the formulae II, III and IV

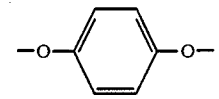

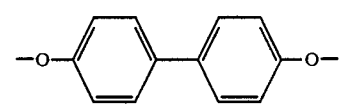

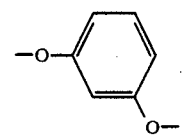

(c) a molar amount corresponding to the total amount of components (a) and (b) of repeat units of the formulae V and/or VI

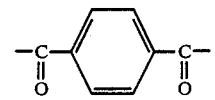

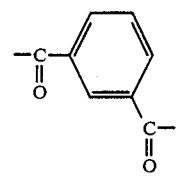

(d) repeat units of the formula VII

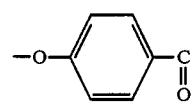

(e) if desired from 5 to 25 mol % of repeat units of the formula VIII

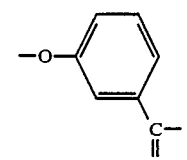

the mole percentages of components (a), (b), (c), (d) and (e) adding up to 100 mol % in each case, and the preparation and use thereof.

9 Claims, No Drawings

WHOLLY AROMATIC MESOMORPHIC POLYESTER AMIDES AND THE PREPARATION THEREOF

The present invention relates to wholly aromatic mesomorphic polyester amides which form a liquid-crystalline fiber-forming melt below 320° C.

Liquid-crystalline polyester amides are known. However, these polymers are in need of improvement in heat distortion resistance, processability and, especially, abrasion resistance. U.S. Pat. No. 4,355,132 describes polyester amides based on 4-hydroxybenzoic acid, 2,6-naphthalenedicarboxylic acid, hydroquinone, isophthalic acid and 4 aminophenol or 1,4-phenylenediamine. U.S. Pat. No. 4,330,457 describes polyester amides based on hydroxynaphthalenecarboxylic acid, terephthalic acid, hydroquinone and p-aminophenol. However, these polyester amides have a glass transition temperature of about 105° C. The same is true, of the polyester amides disclosed in U.S. Pat. No. 4,351,917, which are based on p-aminophenol, p-hydroxybenzoic acid and hydroxynaphthalenecarboxylic acid. European Pat. No. 7,715 describes polyester amides which are based to not less than 50% on radicals of p-aminophenol and also alkoxy terephthalic acid. Finally, EP Application No. 81,900 discloses polyester amides which are not less than 40% coaxial units such as aromatic dicarboxylic acids, hydroxyaromatic carboxylic acids, bisphenols and aminophenols and contain a sufficient amount of nonlinear radicals which are derived from aromatic meta-amino compounds or binuclear aromatic sulfones. However, no indication is given as to the composition required for obtaining the desired composition of properties.

It is an object of the present invention to provide wholly aromatic mesomorphic polyester amides which form a liquid-crystalline fiber-forming melt below 320° C. and thus are easily processable and, moreover, have a high heat distortion resistance, a high abrasion resistance and also high resilience.

We have found that this object is achieved with wholly aromatic mesomorphic polyester amides which form a liquid-crystalline fiber-forming melt below 320° C. and are composed of (a) from 3 to 30 mol % of repeat units of the formula I

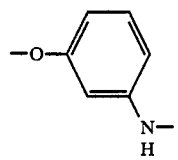

I (b) from 3 to 25 mol % of one or more of the repeat units of the formulae II, III and IV

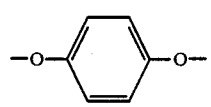

II

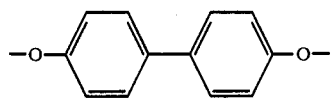

III

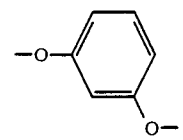

IV (c) a molar amount corresponding to the total amount of components (a) and (b) of repeat units of the formulae V and/or VI

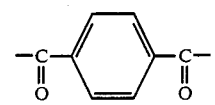

V

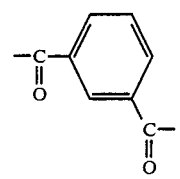

VI (d) repeat units of the formula VII

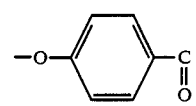

VII (e) if desired from 5 to 25 mol % of repeat units of the formula VIII

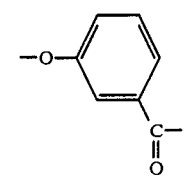

VIII the mole percentages of components (a), (b), (c), (d) and (e) adding up to 100 mol % in each case.

The novel polyester amides have the advantage of forming a liquid-crystalline fiber-forming melt at below 320° C. and of being easily processable. They have the further advantage of a smooth abrasion-resistant surface and a high heat distortion resistance. Furthermore, the novel polyester amides have good mechanical properties, in particular a high notched impact strength.

The liquid-crystalline state of the polyester amides can be detected with a polarization microscope by a method described in German Published Application DAS No. 2,520,819. Applied in a thickness of 10 μm between glass plates and viewed between crossed polarizers, the polymer melts have textures which can be ascribed to a mesomorphic phase.

The polyester amides according to the invention are composed of (a) from 3 to 30 mol %, in particular from 5 to 25 mol %, of repeat units of the formula I

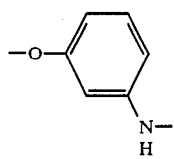

I a suitable starting compound being m-aminophenol, (b) from 3 to 25 mol %, preferably from 5 to 20 mol %, of one or more of the repeat units of the formula II, III or IV

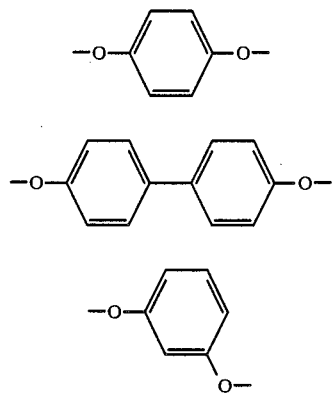

II

III

IV suitable starting compounds being, for example, hydroquinone, 4,4'-dihydroxybiphenyl or resorcinol, and particular preference being given to repeat units of the formulae II and III and mixtures thereof, (c) a molar amount corresponding to the total amount of components (a) and (b) of repeat units of the formulae V and/or VI

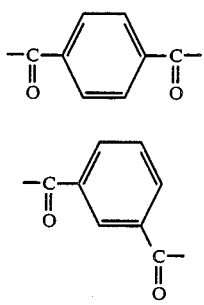

V

VI suitable starting compounds being, for example, terephthalic acid and isophthalic acid, (d) repeat units of the formula VII, advantageously in an amount of not less than 10 mol %, in particular not less than 20 mol %

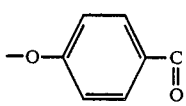

VII a suitable starting compound being, for example, p-hydroxybenzoic acid, (e) if desired from 5 to 25 mol %, in particular from 5 to 15 mol %, of repeat units of the formula VIII

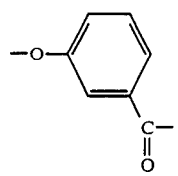

VIII a suitable starting compound being, for example, m-hydroxybenzoic acid.

Particular preference is given to the polyester amides which are composed of repeat units of the formulae I, II, III, V, VI and VII in the abovementioned molar ratios.

Preferred wholly aromatic polyester amides have a glass transition temperature of >140° C., in particular >150° C. This glass transition temperature is measured by the DSC method as described by K. H. Illers in Makromol. Chem. 127 (1969), 1. The wholly aromatic liquid-crystalline polyester amides form a liquid-crystalline fiber-forming melt at <320° C. Preference is also given to liquid-crystalline aromatic polyester amides which have partial crystallinity at >200° C. and <300° C.

The liquid-crystalline polyester amides according to the invention can be obtained in a manner similar to that described in, for example, U.S. Pat. Nos. 4,375,530 and 4,118,372.

In an advantageous embodiment, the polyester amides according to the invention are obtained in a single-stage process by reacting the starting materials in the underivatized state using anhydrides of lower fatty acids, for example fatty acids of 2 to 4 carbon atoms, in particular acetic anhydride. This reaction may be catalyzed with from 0.001 to 1% by weight of catalysts of the type described, for example, in EP-A-No. 1,318,846 (page 9). In the reaction, the underivatized starting materials are heated together with the fatty acid anhydride, which is advantageously present in a molar excess of not less than 5%, based on the hydroxyl and amino groups present, with stirring in an inert gas atmosphere to a temperature at which reflux occurs. Advantageously the temperature is increased in stages, for example to 130°-200° C. in not more than 5 hours, preferably up to 2 hours. The temperature is then raised to 250°-350° C., for example in the course of 2-2 ½ hours, while excess fatty acid anhydrides and fatty acids are distilled off. To complete the reaction, it has been found to be advantageous to employ reduced pressure, for example from 200 to 0.1 mbar toward the end of the reaction.

It is a remarkable and unforeseeable feature of this single-stage process that the desired polymers are obtained in a relatively short time in a troublefree and complete reaction without catalyst. This is all the more remarkable as the large number of chemically different hydroxyl and amino groups would be expected to lead to differences in reactivity and hence to inadequate polymer synthesis.

The wholly aromatic liquid-crystalline polyester amides thus obtained are advantageously further condensed in the solid state, for example at 150°-250° C., until the desired viscosity is obtained. This postcondensation in the solid phase can take place not only before but also after thermoplastic processing. The solid phase condensation is advantageously carried out in an inert gas atmosphere, for example nitrogen.

The polyester amides according to the invention can be modified by adding conventional active amounts of conventional additives such as stabilizers, oxidation inhibitors, agents against thermal decomposition and decomposition by ultraviolet light, lubricants, mold release agents, colorants such as dyes and pigments, fibrous or pulverulent fillers and reinforcing agents, nucleating agents or plasticizers.

The stabilizers can be added to the polymer at any stage of processing or when completed. Preferably the stabilizers are added early on to prevent the onset of decomposition before the polymer is protected.

The oxidation inhibitors and heat stabilizers which can be added to the polyester amides include those which are generally added to the polymers, such as halides of metals of group I of the periodic table, for example halides of sodium, potassium or lithium such as chlorides, bromides or iodides with copper(I) halides such as chlorides, bromides or iodides, sterically hindered phenols, hydroquinones, various substituted representatives of these groups and combinations thereof in concentrations of up to 1% by weight, based on the polymer. Suitable UV stabilizers are for example substituted resorcinols, salicylates, benzotriazoles, benzophenones and the like, and mixtures thereof. These UV stabilizers are generally employed in amounts of up to 2% by weight, based on the polymer.

It is also possible to add organic dyes such as nigrosine, pigments such as titanium dioxide, cadmium sulfide, cadmium sulfide selenide, phthalocyanines, ultramarine blue or carbon black. Dyes and pigments are generally employed in amounts of up to 5.0% by weight. It is also possible to add fibrous or pulverulent fillers and reinforcing agents such as carbon fibers, glass fibers, amorphous silica, asbestos, calcium silicate, aluminum silicate, magnesium carbonate, kaolin, chalk, quartz powder, mica and feldspar in general in amounts of up to 70% by weight of the composition thus formulated. Suitable nucleating agents are, for example, talc, calcium fluoride, sodium phenylphosphinate, aluminum oxide and finely divided polytetrafluoroethylene. Suitable additives are finally plasticizers in amounts of up to 20% by weight, such as dioctyl phthalate, dibenzyl phthalate, butyl benzyl phthalate, hydrocarbon oils, N-n-butylbenzenesulfonamide and o- and p-tolueneethylsulfonamide.

The wholly aromatic liquid-crystalline polyester amides according to the invention are suitable for preparing filaments, films, foams and industrial moldings by injection molding, pressing or extruding.

The moldings prepared from the polyester amides according to the invention have excellent mechanical properties such as stiffness, strength and resilience. They are remarkably resistant to chemicals and flame-retardant. They also have a high heat distortion resistance and a smooth abrasion-resistant surface. The polyester amides according to the invention are therefore highly suitable for preparing moldings for electrical engineering, data processing, automotive construction and other industrial sectors. But they can also be used as surface coating materials, in pulverulent dispersions or as film.

The invention is illustrated by the following examples.

EXAMPLE 1

0.2 mol of terephthalic acid, 0.26 mol of p-hydroxybenzoic acid, 0.07 mol of hydroquinone, 0.07 mol of dihydroxybiphenyl, 0.06 mol of m-aminophenol and 85 ml of acetic anhydride are heated with stirring under nitrogen from 150° C. to 300° C. in the course of 3 h, while excess acetic anhydride and acetic acid are distilled off. The pressure is then reduced to 55 mbar in the course of 1 h to give a viscous fiber-forming melt. The polymer melt and the cold polymer have a pearlescent luster. The polymer has a smooth, hard and abrasion-resistant surface. DSC measurements indicate a glass transition temperature of 154° C. and a melting point of 290° C. The intrinsic viscosity is 1.93 dl/g, measured at 60° C. in an 0.1% strength (wt./vol.) solution in pentafluorophenol.

EXAMPLE 2

0.2 mol of terephthalic acid, 0.26 mol of p-hydroxybenzoic acid, 0.07 mol of hydroquinone, 0.04 mol of dihydroxybiphenyl, 0.09 mol of m-aminophenol and 105 ml of acetic anhydride are heated with stirring under nitrogen from 150° C. to 350° C. in the course of 2 h 40 min, while excess acetic anhydride and acetic acid are distilled off. The pressure is then reduced to 110 mbar in the course of 40 min to give a highly viscous fiber-forming melt. The polymer melt and the cold polymer have a pearlescent luster. The polymer has a smooth, hard and abrasion-resistant surface. DSC measurements indicate a glass transition temperature of 158° C.

The intrinsic viscosity is 1.09 dl/g, measured at 60° C. in an 0.1% strength (wt./vol.) solution in pentafluorophenol.

EXAMPLE 3

0.2 mol of terephthalic acid, 0.26 mol of p-hydroxybenzoic acid, 0.07 mol of hydroquinone, 0.13 mol of m-aminophenol and 105 ml of acetic anhydride are heated with stirring under nitrogen from 150° C. to 300° C. in the course of 2 h 40 min, while excess acetic anhydride and acetic acid are distilled off. The pressure is then reduced to 90 mbar in the course of 40 min to give a highly viscous fiber-forming melt. The polymer has a smooth, hard and abrasion-resistant surface. DSC measurement indicates a glass transition temperature of 166° C. The intrinsic viscosity is 0.62 dl/g, measured at 60° C. in an 0.1% strength (wt./vol.) solution in pentafluorophenol.

EXAMPLE 4

0.25 mol of isophthalic acid, 0.325 mol of p-hydroxybenzoic acid, 0.0875 mol of hydroquinone, 0.0875 mol of 4,4'-dihydroxybiphenyl, 0.075 mol of m-aminophenol and 105 ml of acetic anhydride are heated with stirring under nitrogen from 150° C. to 300° C. in the course of 2 h 50 min, while excess acetic anhydride and acetic acid are distilled off. The pressure is then reduced to 75 mbar in the course of 25 min to give a viscous fiber-forming melt. The polymer has a smooth, hard and abrasion-resistant surface. DSC measurement indicates a glass transition temperature of 142° C. The intrinsic viscosity is 0.93 dl/g, measured at 60° C. in an 0.1% strength (wt./vol.) solution in pentafluorophenol.

We claim:

1. A wholly aromatic mesomorphic polyestr amide which forms a liquid-crystalline fiber-forming melt below 320° C. and is composed of (a) from 3 to 30 mol % of repeat units of the formula I

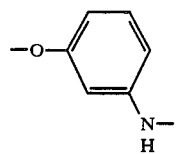

(b) from 3 to 25 mol % of one or more of the repeat units of the formulae II, III and IV

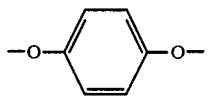

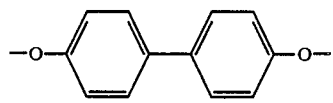

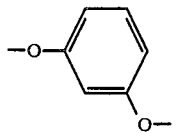

(c) a molar amount corresponding to the total amount of components (a) and (b) of repeat units of the formulae V and/or VI

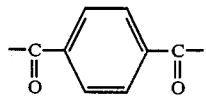

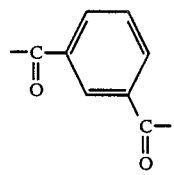

(d) repeat units of the formula VII

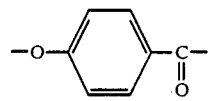

(e) if desired from 5 to 25 mol % of repeat units of the formula VIII

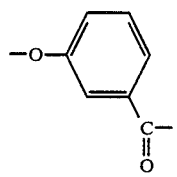

the mole percentages of components (a), (b), (c), (d) and (e) adding up to 100 mol % in each case.

2. A wholly aromatic mesomorphic polyester amide as claimed in claim 1, composed of
   (a) from 5 to 25 mol % of repeat units of the formula I,
   (b) from 5 to 20 mol % of one or more of the repeat units of formulae II, III and IV
   (c) a molar amount corresponding to the total amount of components (a) and (b) of repeat units of the formulae V and/or VI,
   (d) not less than 20 mol % of repeat units of the formula VII.

3. A wholly aromatic mesomorphic polyester amide as claimed in claim 1, composed of repeat units of the formulae I, II and/or III and repeat units of the formula V or VI and repeat units of the formula VII.

4. A wholly aromatic mesomorphic polyester amide as claimed in claim 1, which has a glass transition temperature Tg >140° C.

5. A process for preparing a wholly aromatic mesomorphic polyester amide as claimed in claim 1 by reacting the monomers in the form of underivatized hydroxyamino and carboxy compounds in a single-stage process and in the molar ratios described in the presence of excess fatty acid anhydride at elevated temperature and distilling fatty acid anhydride and fatty acid out of the reaction mixture.

6. A process as claimed in claim 5, wherein the wholly aromatic polyester amide, after the condensation in the melt, is postcondensed in the solid phase at 150°–250° C.

7. A fiber from a polyester amide as claimed in claim 1.

8. A film from a polyester amide as claimed in claim 1.

9. A molding from a polyester amide as claimed in claim 1.

* * * * *